Oct. 7, 1941.                W. A. HYLAND ET AL                2,258,494
                                 CORN SHELLER
                              Filed Sept. 26, 1938          4 Sheets-Sheet 1
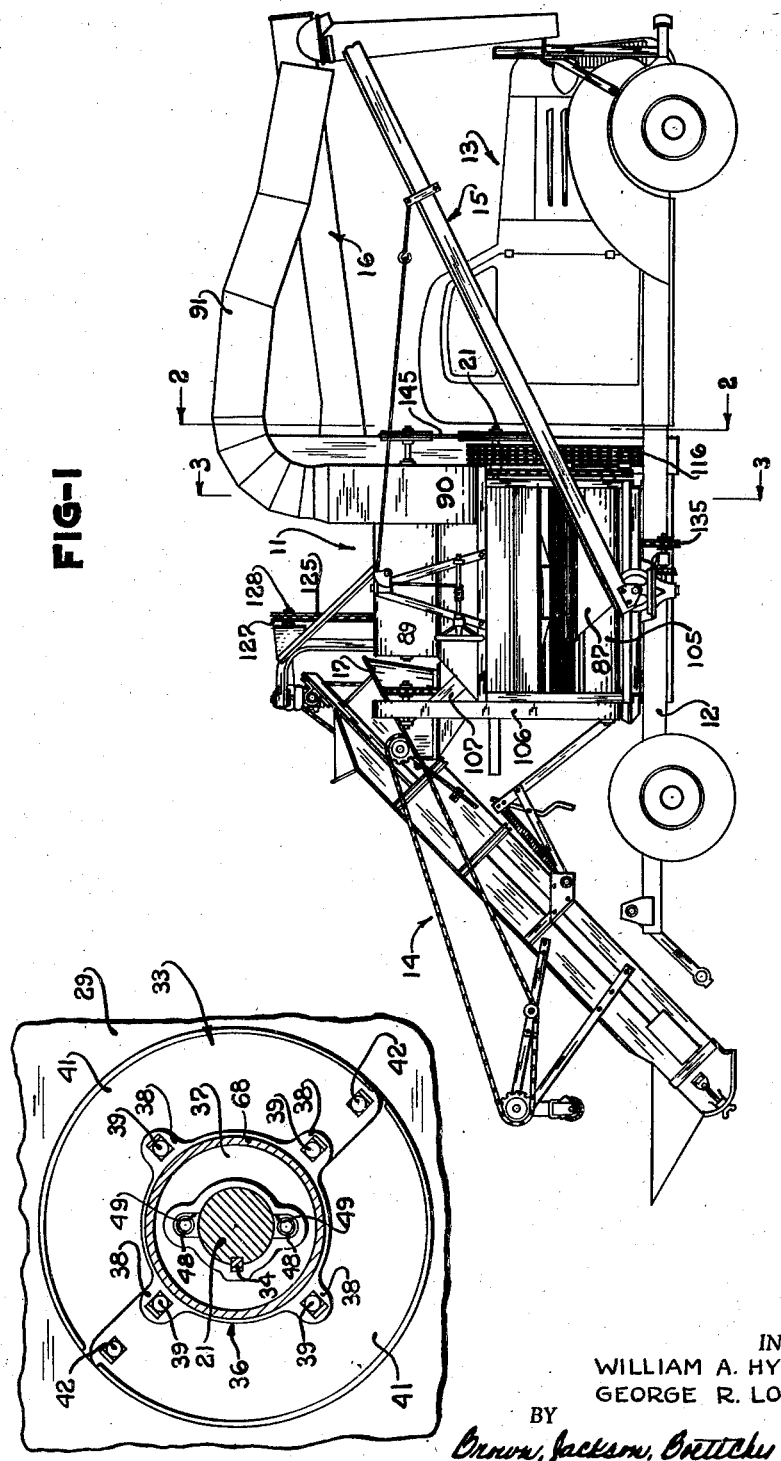
INVENTORS
WILLIAM A. HYLAND
GEORGE R. LOUTHAN
BY
ATTORNEYS Oct. 7, 1941.  W. A. HYLAND ET AL  2,258,494
CORN SHELLER
Filed Sept. 26, 1938  4 Sheets-Sheet 2

INVENTORS
WILLIAM A. HYLAND
GEORGE R. LOUTHAN
BY
ATTORNEYS

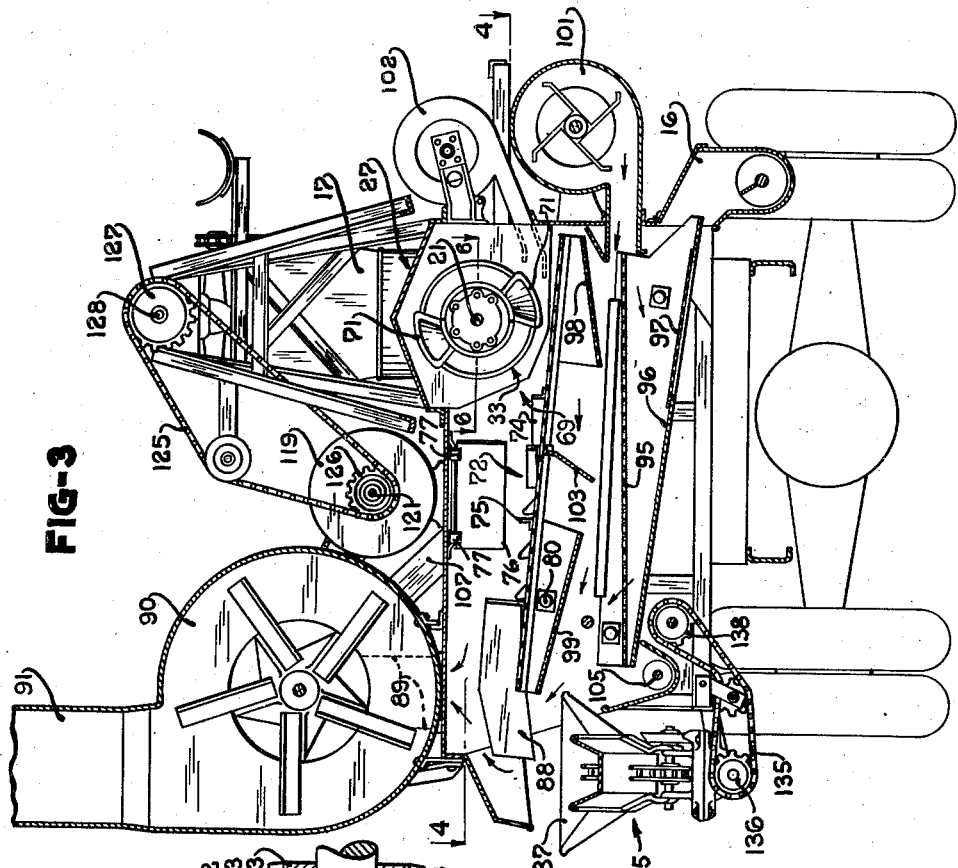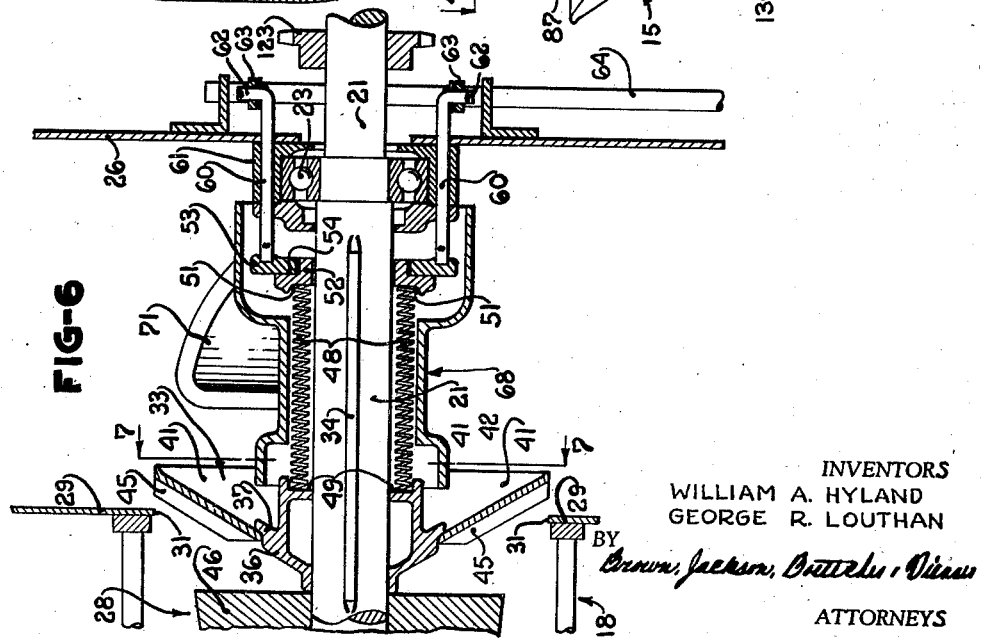

Oct. 7, 1941.  W. A. HYLAND ET AL  2,258,494

CORN SHELLER

Filed Sept. 26, 1938  4 Sheets-Sheet 4

INVENTORS
WILLIAM A. HYLAND
GEORGE R. LOUTHAN
BY
Brown, Jackson, Boettcher & Dienner
ATTORNEYS Patented Oct. 7, 1941

2,258,494

UNITED STATES PATENT OFFICE 2,258,494

CORN SHELLER

William A. Hyland, Horicon, Wis., and George R. Louthan, Moline, Ill., assignors to Deere & Company, Moline, Ill., a corporation of Illinois Application September 26, 1938, Serial No. 231,626

32 Claims. (Cl. 130—6)

The present invention relates generally to corn shellers, and more particularly to the means for retarding the flow of cobs through the shelling cage and the means for distributing the cobs on the cleaning shoe after they are ejected from the shelling cage.

The object and general nature of the present invention is to provide a cob retarding gate or damper at the discharge end of the shelling cage that will provide a gauged and uniform opening around the entire periphery of the cylinder cage so that there will be no variation in the size of the opening between the gate and the shelling cage or any wedge shaped or other irregular openings that will tend to catch husks and silks and thereby clog the machine as with conventional hinged dampers.

Another feature of the invention is to provide a revolving gate mounted coaxially with the shelling cylinder shaft that will act to eject the cobs from the shelling cage by a centrifugal action, whereby the cobs will be ejected equally around the entire periphery of the discharge opening in the shelling cage and will not tend to bunch at any certain point or points.

A further feature of the invention is to provide means on the outside of the sheller housing for adjusting the cob retarding gate to increase or decrease the retarding action of the gate.

A still further feature of the invention is to provide means within the housing for yieldingly forcing the gate toward closed position.

A still further feature of the invention is to provide means for protecting the yielding means and the adjusting means within the housing from contact with the cobs and husks being ejected from the shelling cage whereby entangling of cobs or husks with such operating mechanism is prevented.

A still further feature of the invention is to provide a relatively long cleaning shoe that extends the entire length of the shelling cage and improved distributing means for distributing the cobs ejected from the shelling cage across the entire length of the shoe.

Other objects and advantageous features of the invention will appear from the detailed description thereof in connection with the accompanying drawings, in which—

Figure 1 is a side elevational view of the complete corn sheller which is shown as mounted on an automobile truck;

Figure 2 is a transverse vertical sectional view taken approximately on the plane of the line 2—2 of Figure 1;

Figure 3 is a transverse vertical sectional view taken approximately on the plane of the line 3—3 of Figure 1;

Figure 4:
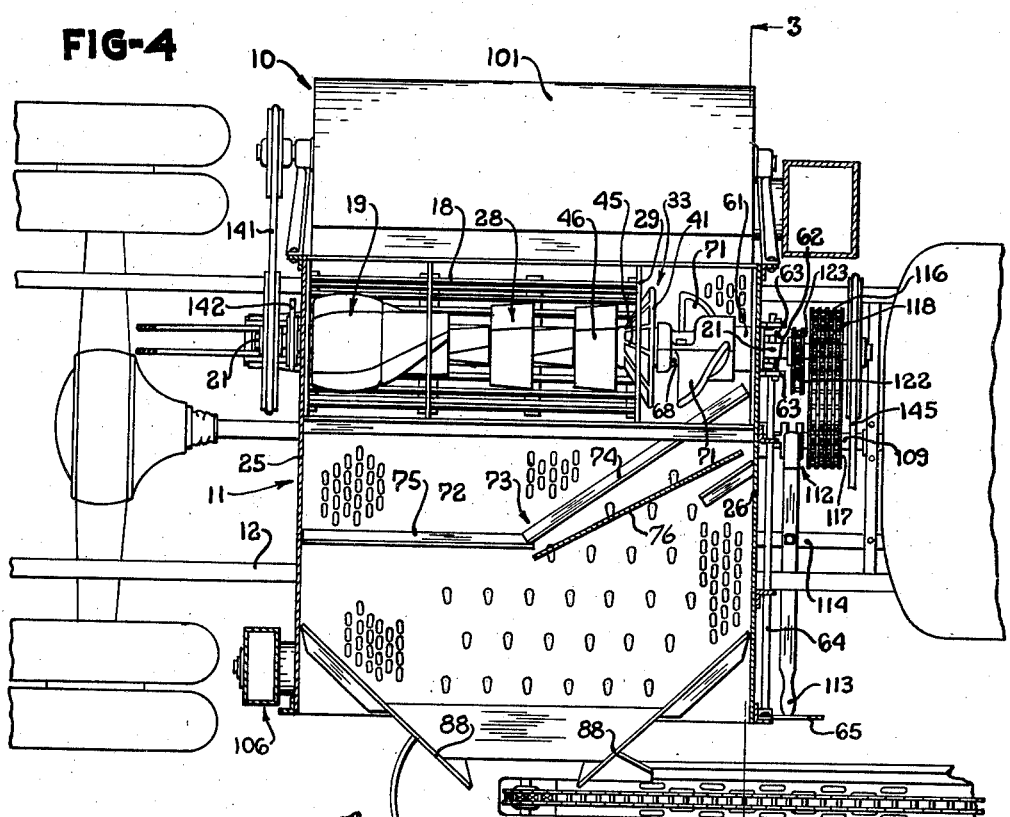
Figure 4 is a horizontal sectional view taken approximately on the plane of the line 4—4 of Figure 3.

Figure 6 is a horizontal longitudinal sectional view, on an enlarged scale, taken approximately on the plane of the line 6—6 of Figure 3, and showing in detail the construction of the cob retarding gate or damper and the means for adjusting said gate from the outside of the housing; and Figure 7 is a transverse vertical sectional view taken approximately on the plane of the line 7—7 of Figure 6 showing the cob retarding gate.

Referring to the drawings, the corn sheller is indicated in its entirety by the reference numeral 10 and includes a housing 11 mounted upon the frame 12 of a motor truck 13, the sheller being disposed transversely on said frame as best shown in Figure 2. Any suitable means may be provided for securing the sheller 10 to the truck frame 12, and since such means forms no part of the present invention, it is not deemed necessary to describe the same herein.

Except for the improvements with which our present invention is more particularly concerned and which will be described later on in detail, the sheller itself is generally similar to that disclosed in Patent No. 1,850,279, to Arthur B. Dieterich, dated March 22, 1932, but is adapted for mounting on an automobile truck rather than supported on its own carrying wheels, and, therefore, only such parts of the sheller will be described in the present application as are necessary for an understanding of the present invention. For further details of the sheller construction reference may be had if desired to the above mentioned Dieterich patent.

The upwardly inclined main feeder, by which the ears of corn are fed to the shelling mechanism, is indicated in its entirety by the reference numeral 14 and extends rearwardly of the automobile truck as shown in Figure 1. This main feeder is pivotally connected at its upper end to the sheller frame so that it may be swung upwardly out of operating position for transport or downwardly into operating position, as desired. The cob stacker that receives the shelled cobs from the shelling mechanism is indicated in its entirety by the reference numeral 15 and extends laterally on the right hand side of the truck, while the shelled corn conveyor, indicated in its entirety by the numeral 16, extends laterally on the left hand side of the truck, looking in a forward direction.

The ears of corn are discharged from the main feeder 14 into a feeder hopper 17 which delivers them into the rear or inlet end of the sheller cylinder or cage 18 that forms a part of the shelling mechanism, which is best illustrated in Figure 4. The ears of corn are fed forwardly or to the right as shown in Figure 4 through the sheller cylinder by a worm feeder unit 19 fixed to a shaft 21 extending centrally through the cylinder 18. The shaft 21 is supported adjacent its ends in ball bearings 23 supported in any suitable manner in the side walls 25 and 26 of the sheller housing 11 (see Figures 4 and 6), the sheller cylinder or cage 18 being disposed in a portion 27 (Figures 2 and 3) of the main housing 11.

The ears are urged forwardly through the sheller cage by the worm feeder unit 19 and are acted upon in the usual manner by a sheller head 28, which consists of a number of shelling beaters, fixed on the shaft 21 forwardly of the worm feeder unit 19 and within the shelling cage 18 as seen in Figure 4. This sheller head is of conventional construction and it is therefore believed to be unnecessary to describe the same in detail herein. By the action of the shelling beaters the ears of corn are rubbed together and against the shelling cage to remove the kernels of corn from the cobs as is usual in corn sheller constructions.

The outlet gate of the sheller cage comprises a metal plate 29 (see Figures 4 and 6) that has a relatively large circular opening 31, the diameter of which is approximately equal to the inside diameter of the sheller cage, and it is through this outlet gate that the shelled cobs are ejected after the shelling operation is completed. The exit of the shelled cobs from the outlet opening 31 at the discharge end of the cage 18 is controlled by a cob retarding gate or damper that is indicated in its entirety by the numeral 33, and it is with the construction of this gate or damper that the present invention is more particularly concerned.

As best shown in Figure 6, the cob retarding gate 33 is substantially cone-shaped and is mounted on the cylinder shaft 21 by means of a spline 34 so that said gate will rotate with the shaft 21 but will be slidable axially on said shaft. The construction of the gate 33 is best illustrated in Figures 6 and 7, and as there shown it comprises a unitary hub member 36 in the form of a suitable casting having an outwardly extending radial flange 37. Formed integral with and extending outwardly from the flange 37 are a plurality of lugs 38 to which are secured, as by bolts 39, a pair of overlapping plates 41 that together form the conical surface of the gate. The heads of the bolts 39 are countersunk in the surface of the plates 41 so that a smooth unobstructed surface is provided. As shown in Figure 7, the overlapping portions of the plates 41 adjacent their outer edges are also secured together by countersunk bolts 42. While in the illustrated construction the radial flange 37 of the gate is shown as provided with four lugs 38 to which the pair of overlapping plates 41 are secured, it is to be understood that any desired number of such lugs and any desired number of overlapping plates may be used to form the gate or damper. By forming the plate portion 41 of the retarding gate or damper in two overlapping sections secured together and to the hub member 36 as above described, it is possible to replace either or both the gate sections in case of breakage or damage without the necessity of removing the cylinder shaft 21 from its bearings, as would be necessary if the gate or damper were constructed in one piece and secured to the shaft 21. The conical plates 41 on their outer sides, i. e., the sides adjacent the sheller head 28, are provided with substantially radially extending ribs 45 that, as the gate rotates with the cylinder shaft, act to engage the cobs as they are forced from the shelling cage and to throw such cobs outwardly through the gate opening by centrifugal force.

As shown in Figure 6, the minimum size of the gate opening is limited by the inner end of the hub 36 of the retarding gate or damper coming into engagement with the hub portion 46 of the sheller head 28, but the size of such gate opening may be increased as necessary or desirable by the outward movement of the gate axially along the shaft 21 away from the sheller head 28 toward the right as viewed in Figure 6, this being permitted by the splined connection 34 between the gate and the shaft.

Means is provided for biasing the gate or damper 33 at all times toward closed position regardless of the setting of the gate on the shaft to vary the size of the gate opening, and this means comprises a plurality of compression springs 48, two of which are shown in Figure 6, that are disposed around the shaft 21 and extend parallel to said shaft as shown. One end of each of the springs 48 is set in a socket or recess 49 formed in the hub 36 of the gate or damper, while the opposite end of each spring is adapted to seat in a socket or recess 51 formed in an annular splined member 52 that is secured by the spline 34 to the shaft 21 so as to rotate with said shaft but have axial movement along said shaft. The annular member 52 forms the rotating member of a thrust bearing, the non-rotating member of which is formed by a second annular member 53 that has a portion thereof fitting in an annular recess 54 in the rotating member 52, and it is by means of this thrust bearing, comprising the members 52, 53, that the compression of the springs 48 is adjusted to increase or decrease the retarding action of the gate 33 on the cobs in the shelling cage. That is to say, the member 53 of the thrust bearing is moved axially along the shaft toward or from the shelling cage to increase or decrease the pressure of the springs 48 on the gate 33.

The position of the thrust member 53 is adjusted from outside of the sheller housing by means which will now be described. This means, as best shown in Figure 6, comprises a pair of thrust rods 60 slidably supported in a stationary bearing block 61 fixed in any suitable manner on the inner side of the wall 26 of the housing, which bearing block supports the ball bearing 23 at the outer end of the sheller cylinder shaft 21 that has been before described. The inner ends of the thrust rods 60 are set in sockets provided therefor in the thrust bearing member 53, while the outer ends of said rods extend outwardly through openings provided therefor in the bearing block 61 and wall 26. On the outer side of the wall 26 said rods have their ends bent at right angles, as shown at 62, to engage the respective ends 63 of a forked operating lever that is pivotally mounted in any suitable manner on the outer side of the wall 26 of the sheller housing and actuated by a control rod 64 (see Figures 2 and 4) that extends to a manually operable control lever 65.

As will be readily appreciated, by operating the control lever 65 the thrust rods 60 may be moved in one direction or the other to thereby move the thrust bearing members 52—53 axially along the cylinder shaft 21 in one direction or the other to increase or decrease the pressure exerted on the gate 33 by the springs 48, so that the amount of retarding action of the gate on the cobs coming out of the sheller cylinder may be varied to suit ears of corn of different conditions. For instance, when the corn is easy to shell, as when the ears are husked before they are fed into the sheller and are comparatively dry, the time required to shell such ears clean is comparatively small, and in such case the pressure on the damper 33 is set comparatively light by operating the control lever to move the thrust bearing 52—53 outwardly or toward the right along the shaft 21 as viewed in Figure 6, so that the cobs are allowed to pass through the gate easily without any appreciable resistance by the retarding gate 33. On the other hand, if the ears are hard to shell, as for instance when the husks are still on the ears and the corn is relatively moist, in which case the ears require a much longer period of shelling action in the shelling cage, the pressure on the gate is set comparatively heavier by operating the control lever 65 to move the thrust bearing 52—53 inwardly or toward the left along the cylinder shaft 21 as viewed in Figure 6, so that the springs 48 will exert a comparatively heavier pressure against the gate 33 to thereby apply a greater retarding force against the cobs coming out of the gate opening whereby the ears will remain in the shelling cage a longer length of time so that they will be thoroughly shelled. The gate or damper 33 thus insures that the shelling cage is always full of cobs, regardless of their condition, in order to get the maximum shelling action of the cobs rubbing against one another and against the sheller head and sheller cylinder.

The minimum size of the gate opening is slightly smaller than the diameter of the cobs, so that a small amount of pressure behind the cobs is always necessary to force them through the gate opening. In this connection it may be well to point out that in the present construction the gate opening can be made still smaller by inserting washers between the lugs 38 and the conical plates 41 to thereby move such plates closer to the hub portion 46 of the shelling head.

As shown in Figure 6, means is provided for enclosing the thrust bearing springs 48 and the parts of the actuating rods 60 that are within the housing so as to prevent cobs and husks from entangling with such operating mechanisms and preventing their proper operation, and this means comprises a hub member or casing 68 in the form of a suitable casting that is fixed in any suitable manner to the cylinder shaft 21 for rotation therewith.

After the ears of corn are shelled and ejected from the sheller cylinder they are acted upon by a cob distributor comprising a pair of blades 71 that are secured in any suitable manner to the outside of the hub member or casing 68 so that as such casing revolves with the cylinder shaft 21 the blades will act to throw the cobs and husks out of the housing section 27 through an opening 69 (Figure 3) therein and across the length of a cleaning shoe 72 that is provided alongside of and extends the entire length of the sheller cylinder housing, as best shown in Figures 3 and 4. By providing this distributor 71 for forcibly ejecting or throwing the cobs and husks out of the housing 27, it is possible to provide a relatively wider shoe than heretofore as the distributor tends to throw the cobs and husks onto the shoe at a considerable distance away from the outlet opening 69 in the casing, whereby the depth of the material at any point on the shoe is much less than in constructions where no distributor is provided and the cobs and husks are merely forced out of the opening in the housing onto the shoe by the force of the cobs being fed through the shelling cage. With the present construction, in which it is possible to use a wider and longer shoe, the separating action of the shoe to separate the kernels of corn that may be carried out of the shelling cage with the cobs and husks is made more efficient.

Figure 5:
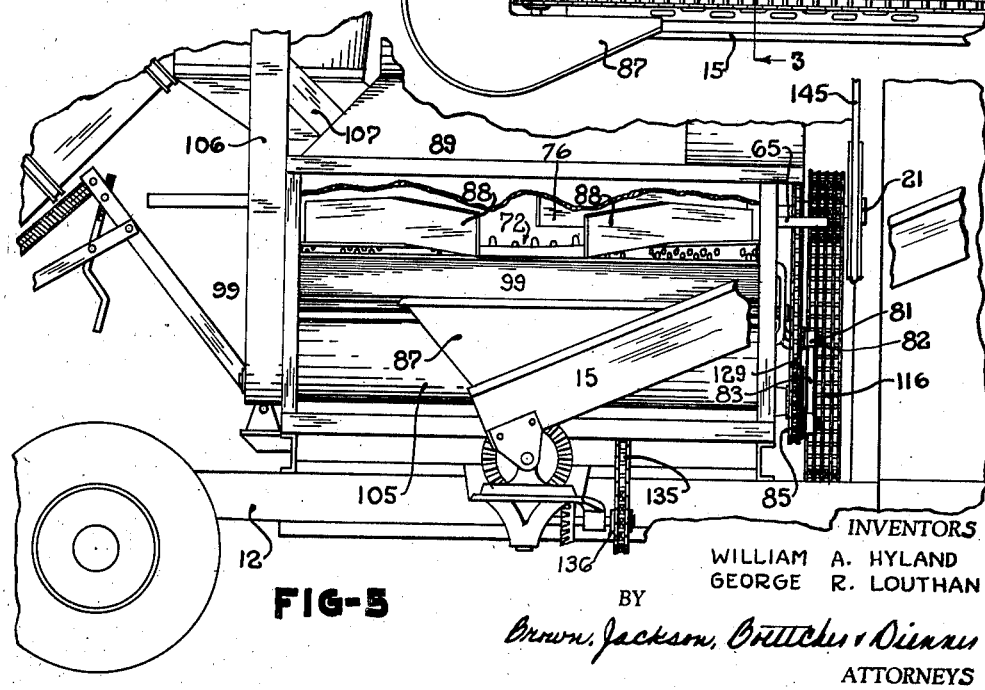
Figure 5 is a fragmentary side elevational view of the cleaning shoe and adjacent parts.

In order to aid the distributing action of the distributor in spreading the cobs and husks fairly equally over the entire cleaning shoe 72, we form the shoe with a downward slope from the cob receiving end thereof to approximately the center of the shoe, as best shown in Figure 5, while the other half of the shoe is formed horizontal. By thus sloping downwardly the cob receiving end of the shoe the cobs as they are thrown onto the shoe will tend to roll or slide downwardly toward the center of the shoe rather than to stop at the point where they fall onto the shoe, thus preventing pilling up of the cobs and husks at one point on the shoe. In the present construction the distribution of the cobs and husks on the cleaning shoe 72 is further augmented by the guide 73, comprising an angle bar 74 secured to the upper surface of the shoe 72 and extending diagonally from a point on the shoe adjacent the cob ejecting opening in the housing to a point approximately at the center of the shoe and a second angle bar 75 secured to the upper surface of the shoe 72 and extending substantially longitudinally of the shoe from the angle bar 74 to the rear end of the shoe, as shown in Figure 5.

The cobs are prevented from being thrown directly outward across the shoe by a sheet metal vane or flap 76 which is supported on hinges 77 from the top of the housing 11, and extends downwardly to a short distance above the shoe 72. The flap 76 is diagonally disposed in the housing, approximately parallel to the angle bar 74 on the shoe, for the purpose of deflecting the cobs to the other end of the shoe as they are thrown by the blades 71. The flap is hinged so that it is free to swing outwardly to prevent cobs from jamming behind it.

As shown in Figure 3, the shoe 72 as a whole is inclined upwardly from the side adjacent the sheller housing to the opposite or cob ejecting side thereof so as to have a slight retarding action on the material delivered thereto and insure better separation of the kernels of corn from among the cobs and husks. The cleaning shoe 72 is also reciprocated in the usual manner by a bell-crank 81 pivotally connected at 80 (Figures 2 and 3) to the shoe and at 82 to a pitman 83 that in turn is pivotally connected to a crank pin 84 on a sprocket 85 which is driven as hereinafter described.

The cobs are discharged from the shoe 72 into the receiving trough 87 of the cob stacker 15, being guided to a point on the shoe above such trough by the guide rails or plates 88, while the husks and silks are drawn upwardly through an intake hood 89 into a blower 90 and discharged therefrom through a flexible pipe 91.

Below the shoe 72 a second shoe or sieve 95 is provided, said second shoe being inclined slightly downwardly from the side adjacent the shelling cage 18 as shown in Figure 3, and is perforated to allow the kernels of corn which drop thereon from the shoe 72 to drop down into a pan 96. The pan 96 is inclined downwardly in the opposite direction to that of the inclination of the sieve 95, or to the right as viewed in Figure 3, to permit the shelled corn to fall into the conveyor 16. The shelled corn in passing from the pan 96 to the conveyor 16 passes over a wire screen 97 which separates out any dust remaining with the corn kernels. A short perforated sieve 98 is fixedly secured in position below the shoe 72 directly below the shelling cage 18 so as to deposit the shelled corn more evenly on the lower sieve 95, and a solid inclined chute 99 is attached to the outer end of the upper shoe 72 below the same to direct the shelled corn back to the center of the lower sieve 95.

A conventional blower 101 is provided, as best shown in Figure 3, for directing a blast of air above and below the lower sieve 95, as indicated by the arrows, to keep the sieve clear of dust and chaff, and a second fan or blower 102 is disposed in a position to send a blast of air across the upper surface of the shoe 72 for the purpose of blowing silks out on the shoe to thereby prevent such silks from falling into the portion of the shoe directly under the cylinder and clogging the openings in the shoe at that point. A baffle plate 103 extending downwardly from the shoe 72 a short distance in front of the chute 99 is provided to direct the air from the fan 101 away from the chute to prevent kernels of corn from being blown rearwardly from the chute 99 and out of the machine. Any shelled corn that passes over the end of the lower sieve opposite the discharge end thereof falls into a tailings conveyor 105 and is conveyed to a tailings elevator 106 from which it is discharged from a spout 107 (Figures 2 and 3) upon the upper shoe 72.

The power for operating the entire corn sheller is obtained from the main transmission shaft 109 of the motor truck, as best shown in Figure 2. For this purpose a jaw clutch 112 (best shown in Figure 4) is provided and is operated by a hand lever 113 supported by a bracket 114 suitably secured to the frame 12 of the truck and extending downwardly therefrom. This clutch is of such construction that when it is operated to connect the transmission shaft of the truck with the sheller operating mechanism the drive to the rear wheels of the motor truck is disconnected. The transmission shaft 109 is connected with the cylinder shaft 21 by a chain 116 trained around a sprocket 117 fixed to the transmission shaft 109 and around a sprocket 118 fixed to the cylinder shaft 21 on the outer side of the wall 26 of the sheller housing.

The feeder governor, by which the feeding of the cobs to the shelling mechanism is controlled so that the sheller is kept running steadily, is indicated as an entirety by the numeral 119 and has its drive shaft 121 driven from the cylinder shaft 21 by a chain 122 trained around a sprocket 123 on the cylinder shaft 21 (see Figures 4 and 6) and around a sprocket 124 on the governor shaft 121 (see Figure 2). A chain 125 trained around a sprocket 126 which is driven by the governor and journaled on the driving shaft 121 of the governor member 119 and trained around a sprocket 127 fixed to the drive shaft 128 of the main feeder 14 acts to drive the conveyor of the main feeder (Figure 1). When the cylinder becomes overloaded and the speed of the machine decreases below a given value, the governor 119 disconnects the drive to the main feeder 14. As this governor mechanism forms no part of the present invention it has not been illustrated in detail herein and is not thought necessary to further describe the same.

The reciprocating bell-crank 81 which oscillates the shoes 72 and 95, is driven by a chain 129 that is trained around the sprocket 85 of the bell-crank mechanism and around a sprocket (not shown) fixed on the governor shaft 121. The shelled corn elevator 16 is driven by a chain 131 which is trained around a sprocket 132 fixed to the governor shaft 121 and around a sprocket (not shown) fixed to the drive shaft 134 of the corn elevator 16. The cob conveyor 15 is driven through a chain 135 trained around a sprocket 136 fixed to the main drive shaft 137 of the conveyor 15 and around a sprocket 138 (see Figure 3) that is connected to the sprocket 85 (Figure 2) that drives the bell-crank 81. The fans 101 and 102 are driven by V-belts 141 and 142, respectively, from the rear end of the cylinder shaft 21 as best shown in Figures 1, 4 and 5, while the blower 90 is driven from the forward end of the cylinder shaft 21 by a V-belt 145.

While we have shown what we consider to be the preferred embodiment of our invention, it will be understood that numerous changes and rearrangements may be made therein without departing from the essence of the invention.

What we claim as our invention and desire to secure by Letters Patent is:

1. A corn sheller comprising, in combination, a sheller head, a shelling cage enclosing said head and having a discharge opening, a cob retarding gate slidably mounted with respect to and rotatable with said head, means biasing said gate toward a closed position with respect to said discharge opening whereby to yieldingly retard the cobs being forced through said opening, and stop means limiting the movement of said gate toward closed position to maintain an opening between said gate and said cage equal to nearly the diameter of a corn cob.

2. A corn sheller comprising, in combination, a housing, a cylindrical shelling cage supported within said housing, a sheller head rotatably mounted in said cage, a cob retarding gate mounted coaxially with said sheller head to provide an annular gauged discharge opening around the entire periphery of the shelling cage at the discharge end thereof, means for biasing said gate toward a position to close said discharge opening, means for adjusting said biasing means to increase or decrease the retarding action of the gate, housing means enclosing said adjusting mechanism and said biasing means to prevent entangling of cobs and husks therein, and cob distributing means carried by said housing means.

3. A corn sheller comprising, in combination, a housing, a shelling cage supported in said housing and having a discharge opening, a rotatable shaft supported in said housing, a sheller head fixed to said shaft, a cob retarding gate slidably mounted on said shaft to rotate therewith within said housing adjacent the discharge end of said cage, biasing means extending along said shaft inwardly toward said cob retarding gate for urging the same for movement toward the discharge end of said cage, an outlet opening at one side of said housing, and a distributor fixed to said shaft on the outer side of said gate for forcibly ejecting cobs from the housing through said outlet opening and having passages receiving said biasing means.

4. A corn sheller comprising, in combination, a housing, a rotatable sheller head mounted in said housing, a shelling cage enclosing said head and having inlet and discharge openings, a cob retarding gate mounted coaxially with and rotatable with said head, means biasing said gate toward a closed position with respect to said discharge opening, a casing member rotatable with said gate and enclosing said biasing means, an opening in one side of said housing adjacent said casing member, and distributing means on said casing member for contacting the cobs and throwing them outwardly through said opening.

5. A corn sheller comprising, in combination, a housing, a shelling cage supported in said housing and having a discharge opening, a rotatable shaft supported in said housing, a sheller head fixed to said shaft, a cob retarding gate fixed to rotate with said shaft within said housing adjacent the discharge end of said cage, an outlet opening at one side of said housing, a distributor fixed to said shaft adjacent said gate for forcibly ejecting cobs from the housing through said outlet opening, and a cleaning shoe supported adjacent said outlet opening for receiving cobs from said distributor, said shoe being inclined downwardly from the side thereof adjacent said outlet opening in the housing to approximately the center thereof to provide an inclined surface down which the cobs will move to thereby more equally distribute the cobs on the shoe.

6. A corn sheller comprising a shelling cage, a shelling head rotatable therein, a cob shoe extending substantially the length of said cage, and a cob distributor secured to said rotatable head at the discharge end of said cage and formed to distribute cobs substantially uniformly over said shoe, said cob shoe extending beyond said cage to a point adjacent said cob distributor and the portion of said cob shoe adjacent said distributor extending upwardly generally radially away from said cage and downwardly longitudinally of the cage away from said distributor to a point approximately centrally of the shoe, the remainder of the shoe being substantially horizontal.

7. In a corn sheller having a cylindrical shelling cage having perforations for discharging kernels of corn and an opening at the end for discharging shelled cobs, a rotatable shelling beater within said cage, a housing enclosing said cage and beater, and a rotatable shaft journaled in said housing and supporting said shelling beater, a cob damper splined on said shaft at the discharge end of said shelling cage and rotatable with said shaft and beater, a member encircling the shaft adjacent the outer end thereof and movable axially of said shaft, spring means interposed between said member and said cob damper, and means for adjusting the position of said member axially of said shaft to control the bias exerted by said spring means against the cob damper.

8. A cob damper unit as defined in claim 7, further characterized by a housing fixed to said shaft between said cob damper and said member and including sections embracing the cob damper and member in generally telescoping relation so as to accommodate movement of both with respect to said shaft.

9. A cob damper unit as defined in claim 7, further characterized by said adjusting means including a pair of generally axially extending rods connected with said member at one end and extending at the other end outside the housing, and means secured adjacent said shaft outside said housing for shifting said rods to adjust the tension exerted by said spring means against said cob damper.

10. A cob damper unit as defined in claim 31, further characterized by said adjusting mechanism including a ring member splined to rotate with said shaft and to move axially thereof, spring means interposed between said ring member and said cob damper, a second ring member rotatably connected with said first ring member, a pair of axially extending rods connected at their inner ends to said second ring member and adapted to hold the latter against rotation but to shift the same and said first ring member axially to adjust the tension exerted by said spring means against the cob damper, and a pair of arms carried by said transverse shaft on opposite sides of the shelling shaft and connected with said second ring whereby rocking movement of the transverse shaft acts through said rods to adjust the position of said cob damper.

11. A corn sheller comprising a housing, a shelling cage disposed therein and having a discharge end spaced from one wall of said housing, a shaft journaled for rotation in said housing and carrying a sheller head fixed thereto and disposed in said cage, a cob damper comprising a conical member mounted to rotate with said shaft at the discharge end of said cage and having its inner portion disposed within said discharge opening and its outer portion disposed outwardly thereof, whereby the rotation of said cob damper with said head serves to eject the cobs centrifugally from the shelling cage, a cob distributor secured to said shaft in the space between the discharge end of said shelling cage and said one wall of the housing and outwardly of said cob damper, a cob shoe extending alongside the shelling cage from one end to the other and including a portion disposed underneath said cob damper and said cob distributor in the space between the discharge end of said shelling cage and said one wall of the housing, a guide fixed to said cob shoe and including a first section extending diagonally from a point on the cob shoe adjacent said cob distributor to a point generally in the central portion of the cob shoe, and a second section extending from said latter point along the shoe generally parallel to the axis of said shelling cage, said housing being open adjacent said cob shoe, and a vane pivotally supported by said housing and suspended therefrom in a position between the open portion of said housing and said cob distributor, said vane extending in a diagonal direction generally alongside the diagonal section of said guide.

12. A corn sheller as defined in claim 11, further characterized by said cob shoe being formed with a downward slope in a generally axial direction from the cob receiving end thereof generally to the central portion of the cob shoe, the latter as a whole having a generally upwardly inclined position laterally of the shelling cage so as to have a retarding action on the material delivered to the shoe by said cob distributor.

13. A corn sheller as defined in claim 11, further characterized by said cob shoe being mounted for reciprocation, means for reciprocating said cob shoe, guide rails secured to the laterally outer portion of the cob shoe in convergent relation with the inner ends spaced apart to provide an opening for the discharge of cobs from said cob shoe, and a cob stacker having a cob receiving hopper disposed underneath said cob discharge opening.

14. A corn sheller as defined in claim 11, further characterized by a blast fan disposed with its outlet arranged transversely of said shelling cage and arranged to direct a blast of air across said shoe.

15. A corn sheller as defined in claim 11, further characterized by a blast fan disposed with its outlet arranged transversely of said shelling cage and arranged to direct a blast of air across said shoe, and means for driving said fan from the end of said shaft opposite said cob distributor.

16. A corn sheller as defined in claim 11, further characterized by an auxiliary blast fan arranged for directing a blast of air across the upper surface of said cob shoe from the shelling cage toward the laterally outer portion of the cob shoe, means for driving said blast fan from one end of said shaft, and means connected with the other end of said shaft for reciprocating said cob shoe.

17. A corn sheller as defined in claim 11, further characterized by an auxiliary blast fan arranged for directing a blast of air across the upper surface of said cob shoe from the shelling cage toward the laterally outer portion of the cob shoe, means for driving said blast fan from one end of said shaft, a cob elevator for receiving cobs from said cob shoe, and means connected with the other end of said shaft for driving the cob elevator and for reciprocating said cob shoe.

18. In a corn sheller, a shelling cage having perforations for discharging kernels of corn and a circular discharge opening for discharging shelled cobs, a shelling beater disposed in said cage and rotatable about an axis passing through the center of said opening, and a conical damper secured to said beater and rotatable coaxially therewith, said damper being disposed in said opening for partially closing the latter but spaced therefrom an amount equal to approximately the diameter of a shelled cob, the apex of the damper being within the shelling cage and the conical surface diverging outwardly therefrom.

19. Mechanism as defined in claim 18, further characterized by the damper having ribs on the conical surface of the damper extending generally outwardly thereon to engage the cobs to eject them from said discharge opening.

20. In a corn sheller, a cylindrical shelling cage having perforations for discharging kernels of corn and an opening at one end thereof for discharging shelled cobs, a shelling beater rotatable therein, a damper fixed to said beater adjacent said discharge opening and rotatable with the beater, and a plurality of cob engaging ribs extending generally outwardly on the inner face of said damper from the axis of rotation for ejecting cobs through the opening during operation.

21. In a corn sheller, a cylindrical shelling cage having perforations for discharging kernels of corn and an opening in the end for discharging shelled cobs, a beater type shelling head rotatable coaxially thereof, a rotary damper supported at the discharge end of said cage and coupled to said shelling head for rotation therewith by means providing for movement of said damper axially toward and away from said shelling head, means limiting the inward movement of said damper toward said head to a position spaced from the discharge end of said cage to provide a minimum cob discharge opening of a width less than the diameter of a cob, spring means for urging said damper toward said limit means, and means for adjusting the pressure exerted by said spring means.

22. A corn sheller comprising a shelling cage having a cob discharge opening adjacent one end thereof, a shelling head mounted within said cage for rotation about a substantially horizontal axis, a cob shoe extending longitudinally of said axis from a position beneath said discharge opening to a position beneath the opposite end of said shelling cage, means for oscillating said shoe to cause a movement of cobs over said shoe in a lateral direction relative to the axis of said shelling head, and guide bars on said shoe extending from a point adjacent said discharge opening to substantially the central portion of said shoe to direct cobs longitudinally thereon as they pass laterally over the shoe.

23. A corn sheller comprising a shelling cage having a cob discharge opening adjacent one end thereof, a shelling head mounted within said cage for rotation about a substantially horizontal axis, a cob shoe extending longitudinally of said axis from a position beneath said discharge opening to a position beneath the opposite end of said shelling cage, means for oscillating said shoe to cause a movement of cobs over said shoe in a lateral direction relative to the axis of said shelling head, and a cob distributing beater mounted on said rotary shelling head adjacent the discharge opening and including blades extending outwardly from the axis of rotation thereof and having portions inclined with respect to the axis of rotation for engaging cobs as they are discharged from the cage and impelling them toward the opposite end of the cob shoe.

24. A corn sheller comprising a shelling cage having a cob discharge opening adjacent one end thereof, a shelling head mounted within said cage for rotation about a substantially horizontal axis, a cob shoe extending longitudinally of said axis from a position beneath said discharge opening to a position beneath the opposite end of said shelling cage, means for oscillating said shoe to cause a movement of cobs over said shoe in a lateral direction relative to the axis of said shelling head, the portion of the shoe adjacent said discharge opening being inclined in a lateral direction away from the cage and also inclined downwardly longitudinally of said cage from said discharge opening to a point approximately centrally of the shoe, the remainder of the shoe beneath the cage being in a plane generally parallel to the axis of said shelling head.

25. In a corn sheller having a perforated cylindrical shelling cage for discharging kernels of corn and an opening at one end for discharging cobs, a rotatable shelling beater within said cage, a housing enclosing said cage and beater, and a rotatable shaft journaled in said housing and supporting said shelling beater, a cob damper splined on said shaft at the discharge end of said shelling cage and rotatable with said shaft and beater, a non-rotatable adjusting member slidably engaged with said damper and extending axially along said shaft through the wall of said housing and shiftable axially relative to said shaft to adjust the position of said damper, and control means outside said housing and connected to said adjusting member for shifting the latter.

26. In a corn sheller having a perforated cylindrical shelling cage for discharging kernels of corn and an opening at one end for discharging cobs, a rotatable shelling beater within said cage, a housing enclosing said cage and beater, and a rotatable shaft journaled in said housing and supporting said shelling beater, a cob damper splined on said shaft at the discharge end of said shelling cage and rotatable with said shaft and beater, a non-rotatable adjusting member slidably engaged with said damper disposed adjacent said shaft and parallel thereto and extending through the wall of said housing, said adjusting member being shiftable axially relative to said shaft to adjust the position of said damper, and a tubular enclosure fixed to said shaft and embracing the latter and said adjusting member for preventing cobs and the like from becoming entangled with the latter.

27. The combination set forth in claim 26 with the further provision of beater members attached to said tubular enclosure and adapted to engage cobs being discharged from said shelling cage.

28. A corn sheller comprising, in combination, a rotatable sheller head, a cylindrical shelling cage enclosing said head and having perforations to pass shelled corn therethrough, a rotatable cob retarding gate mounted coaxially with said head and spaced axially from the end of said cage to provide a gauged discharge opening around the entire periphery of the cylindrical shelling cage at the discharge end thereof, and means for rotating said cob retarding gate so as to force the cobs passing through said opening out of said opening by centrifugal force, said cob retarding gate having ribs thereon to engage the cobs.

29. A corn sheller comprising a housing, a cylindrical shelling cage supported therein and spaced at one end from one wall of the housing, said cage having perforations for discharging kernels of corn and a cob discharge opening at one end thereof, a shaft rotatably carried by the housing and extending through said shelling cage, a shelling beater supported on said shaft within said shelling cage, a hub member slidably mounted on said shaft adjacent the end of the shelling cage spaced from said end of the housing, a conical cob damper secured to said hub and slidable axially of said shaft therewith, and means extending axially alongside said shaft between said hub member and said one end of the housing for yieldably urging the conical cob damper toward said one end of the shelling cage, said conical damper being disposed in a plane of the end of said shelling cylinder and having cob engaging ribs thereon intersecting said plane, the inner surface of said cob discharge opening being relatively smooth to facilitate ejection of the shelled cobs.

30. A corn sheller as defined in claim 29, further characterized by the conical cob damper being adapted to engage the associated end of the shelling beater, the latter serving as a stop limiting the inward movement of said damper toward the discharge end of the shelling cylinder to provide a minimum opening therebetween equal to nearly the diameter of a cob.

31. A cob damper unit for corn shellers and the like having a shelling cage, a shelling beater and shaft rotatably disposed therein, an enclosing housing having one wall spaced from the discharge end of said beater and a bearing supported on said wall in which said shaft is journaled, said cob damper unit comprising a damper member slidably mounted on said shaft at the discharge end of said shelling cage, means preventing rotation of said shaft relative to said damper while permitting relative axial movement, means extending generally axially of said shaft and including a pair of cooperative bearing members encircling said shaft, one of said bearing members being connected with said damper and rotatable therewith, non-rotatable parts connected with the other bearing member and extending through said wall of the housing spaced radially outwardly from said bearing to a point exterior thereof for adjusting the position of said cob damper, a transverse shaft supported on said housing and extending from a point adjacent said first shaft to one side of the housing, a handle on the outer end of said shaft, and a connection from the inner end of said transverse shaft for operating said adjusting means.

32. A corn sheller comprising, in combination, a sheller head, a shelling cage enclosing said head and having a discharge opening, a cob retarding gate slidably mounted with respect to and rotatable with said head, means biasing said gate toward a closed position with respect to said discharge opening whereby to yieldably retard the cobs being forced through said opening, stop means limiting the movement of said gate toward closed position to maintain an opening between said gate and said cage equal to nearly the diameter of the corn cob, and means for adjusting the pressure of said biasing means to increase or decrease the retarding action of said gate.

WILLIAM A. HYLAND.
GEORGE R. LOUTHAN.